US009413610B2

(12) United States Patent
Moore

(10) Patent No.: US 9,413,610 B2
(45) Date of Patent: Aug. 9, 2016

(54) NETWORK-BASED DHCP SERVER RECOVERY

(71) Applicant: Ciena Corporation, Hanover, MD (US)

(72) Inventor: Brian Moore, Ottawa (CA)

(73) Assignee: Ciena Corporation, Hanover, MD (US)

( * ) Notice: Subject to any disclaimer, the term of this patent is extended or adjusted under 35 U.S.C. 154(b) by 373 days.

(21) Appl. No.: 13/869,200

(22) Filed: Apr. 24, 2013

(65) Prior Publication Data

US 2014/0325040 A1    Oct. 30, 2014

(51) Int. Cl.
*G06F 15/16* (2006.01)
*G06F 15/177* (2006.01)
*G06F 15/173* (2006.01)
*H04L 12/24* (2006.01)

(52) U.S. Cl.
CPC ........ *H04L 41/0856* (2013.01); *H04L 41/0672* (2013.01)

(58) Field of Classification Search
CPC ............ G06F 11/1464; G06F 11/2023; G06F 11/203; H04L 69/40; H04L 41/0672; H04L 41/0856
USPC ......... 709/201–203, 213, 216, 220, 221, 223, 709/224, 227, 228, 238, 245, 249
See application file for complete search history.

(56) References Cited

U.S. PATENT DOCUMENTS

| 6,865,192 B1 * | 3/2005 | Barrow | H04L 12/4625 370/475 |
| 6,876,654 B1 * | 4/2005 | Hegde | H04L 12/4625 370/392 |
| 8,972,542 B2 * | 3/2015 | Christenson | H04L 41/0856 709/221 |
| 8,984,106 B2 * | 3/2015 | Christenson | H04L 41/0856 709/221 |
| 2001/0036161 A1 * | 11/2001 | Eidenschink | H04B 7/18584 370/316 |
| 2002/0129128 A1 * | 9/2002 | Gold | H04L 29/06 709/220 |
| 2007/0214275 A1 * | 9/2007 | Mirtorabi | H04L 45/02 709/230 |
| 2008/0177868 A1 * | 7/2008 | Zilbershtein | H04L 29/12273 709/220 |
| 2011/0164508 A1 * | 7/2011 | Arai | H04L 45/00 370/245 |

(Continued)

OTHER PUBLICATIONS

Walker, T. "Optical Transport Network (OTN) Tutorial." ITU. pp. 1-62.

*Primary Examiner* — Edward Kim
(74) *Attorney, Agent, or Firm* — Clements Bernard PLLC; Christopher L. Bernard; Lawrence A. Baratta, Jr.

(57) ABSTRACT

To recover existing IP configuration information directly from an existing network in response to DHCP server failure, unique identifiers corresponding to hosts that a DHCP server provisioned with IP configuration information may be stored on the network in non-volatile memory such that current configuration information associated with the hosts may be obtained from the network in response to the DHCP server failure. For example, in a standalone deployment, messages may be sent to each host, which may respond with the current configuration information. In other scenarios, a summary node may provide summarized configuration information and messages may only be sent to hosts not included among the summarized configuration information, or configuration information may be synchronized among redundant DHCP servers such that messages may be sent to certain hosts based on differences between the configuration information on a mate DHCP server and a DHCP server recovering from failure.

16 Claims, 6 Drawing Sheets

(56) References Cited

U.S. PATENT DOCUMENTS

| | | | |
|---|---|---|---|
| 2013/0166706 A1* | 6/2013 | Christenson | H04L 41/0856 709/221 |
| 2013/0166707 A1* | 6/2013 | Christenson | H04L 41/0856 709/221 |
| 2013/0166723 A1* | 6/2013 | Christenson | H04L 69/40 709/224 |
| 2013/0166737 A1* | 6/2013 | Christenson | H04L 69/40 709/224 |
| 2014/0047081 A1* | 2/2014 | Edwards | G06Q 10/10 709/220 |

* cited by examiner

NETWORK-BASED DHCP SERVER RECOVERY

FIELD OF DISCLOSURE

The present application generally relates to network-based Dynamic Host Configuration Protocol (DHCP) server recovery, and in particular, to allowing one or more DHCP servers to recover existing Internet Protocol (IP) configuration information directly from an existing network.

BACKGROUND

Many computer networks employ Dynamic Host Configuration Protocol (DHCP) to enable a server to automatically assign Internet Protocol (IP) addresses to individual computers in a particular network from a defined address range or address scope that has been configured in the network. More specifically, a particular host or DHCP client device may request an IP address from the DHCP server, which may then provide IP configuration information to the requesting host in order to enable the host to communicate locally within the network and with other hosts that may be located in remote or external networks. For example, the IP configuration information provided to the requesting host may generally include a unique IP address assigned to the host, an IP lease period that defines how long the assigned IP address will be valid, and various other IP configuration parameters (e.g., a subnet mask, default gateway, etc.).

In general, any particular network may deploy one DHCP server in a standalone configuration or multiple DHCP servers in a redundant configuration to service IP address requests and manage IP configurations in the network. Furthermore, in a typical network that employs the DHCP standard, DHCP client devices connect to the DHCP server via one or more network elements, wherein a particular network element (NE) may include a router, switch, hub, or other suitable equipment that provide transport and switching services to enable the DHCP client devices to communicate with other computers on the local network and/or remote or external networks. Accordingly, because each DHCP client device can only receive IP configuration information while connectivity exists with the DHCP server, various problems may arise when one or more DHCP servers fail or otherwise lose connectivity to the network elements that connect the DHCP clients to the DHCP server. However, mechanisms that are typically used to recover from DHCP server failure tend to suffer from various drawbacks and limitations in relation to suitably addressing the problems that may arise when a DHCP server fails or otherwise loses connectivity.

More particularly, FIG. 1 illustrates a network architecture 100 typically used to provide DHCP server recovery, wherein during normal conditions various DHCP client devices located on an internal data network 140 may request IP addresses and receive IP configuration information from a DHCP server 110 via one or more network elements 120a-120c disposed in a communication path between the internal data network 140 and the DHCP server 110 in order to access an IP network 150 (e.g., the Internet). In response to the DHCP server 110 failing or otherwise losing connectivity, standard techniques to recover the DHCP server 110 generally depend on availability and integrity associated with a backup source that maintains IP configuration information that the DHCP server 110 has provided to any DHCP client devices located on the internal data network 140 and any network elements 120a-120c that connect the DHCP client devices to the DHCP server 110. For example, if the DHCP server 110 fails in a redundant deployment, recovery may depend on a redundant DHCP server 115 maintaining the backup source that provides the IP configuration information necessary to recover the DHCP server 110 that failed. However, developing an appropriate DHCP database backup solution to minimize the window in which the backed up database has inaccurate data may require different and often complicated DHCP database backup recovery strategies because any particular customer network may have different or unique characteristics. Additionally, any DHCP database backups must be performed in a timely manner to ensure the most accurate snapshot possible, which can be a substantial burden because frequent DHCP database backups may be necessary.

Furthermore, in a standalone deployment, the architecture 100 would not include the redundant DHCP server 115, meaning that customer intervention would be required to recover from failure associated with the standalone DHCP server 110. For example, in a standalone deployment, the customer that owns the internal data network 140 would be required to maintain a network element management station (EMS) 130 that periodically backs up the IP configuration information from the DHCP server 110 to a DHCP backup database 135, which tends to be a manual and cumbersome process, especially in networks that have many client devices and network elements 120a-120c (e.g., because the DHCP backup database 135 may require substantial storage resources, and even when the typical amount of DHCP data backed up is relatively small, the customer must still have and maintain a reliable mechanism to perform timely DHCP database backups). Furthermore, suitably recovering the DHCP server 110 relies heavily on frequent and timely backups to avoid stale DHCP data, which becomes more likely with network growth and configuration changes, and having the DHCP backup database 135 on the internal data network 140 requires the customer to restore the DHCP server 110 in a timely fashion, which tends to burden customers that desire "plug and play" network operations, administration, and management (OAM) deployment models. For example, as noted above, DHCP backup solutions tend to require complicated recovery strategies and raise substantial management burdens to minimize the window in which the DHCP database backup has stale or otherwise inaccurate data (e.g., frequent DHCP database backups, possibly every few minutes, would be needed during an automatic network discovery phase in which many hosts may be seeking DHCP configurations in a short time period, while subsequent DHCP server recovery needs to happen quickly to ensure that existing configured hosts retain DHCP configured information, for example over lease expiry, and to allow new hosts to receive DHCP configurations as soon as possible).

Another mechanism that may be used to recover from DHCP server failure may involve planning and provisioning static IP addresses (i.e., one IP address persistently assigned to each host), whereby a DHCP server 110 that has failed may simply retrieve the static IP configuration information upon coming back online. However, planning and provisioning static IP configurations in the DHCP server 110 may defeat customers' needs to have a "plug and play" network OAM deployment. For example, to manage an IP-based optical network (e.g., IP network 150), the EMS 130 or another suitable operations support system (OSS) typically associates each network element 120a-120c with a specific IP address and DHCP assigned IP configuration that must be retained for the entire duration that each network element 120a-120c may be deployed. Furthermore, if a customer that owns and operates the internal data network 140 according to an OAM deployment model that involves manually provisioning all IP communications data subsequently chooses to upgrade the network 140 to a "plug and play" network OAM deployment model, the DHCP server 110 would have to discover and configure each network element 120a-120c and DHCP client device, which may consume substantial time and resources.

Accordingly, because existing techniques to recover from DHCP server failure tend to suffer from various drawbacks and limitations, improved techniques to provide DHCP server recovery are desirable.

SUMMARY

The following presents a simplified summary relating to various embodiments disclosed herein that may provide network-based Dynamic Host Configuration Protocol (DHCP) server recovery in order to provide a basic understanding relating to such embodiments. As such, the following summary should not be considered an extensive overview of all contemplated embodiments, nor is the following summary intended to identify key or critical elements of all embodiments described herein or delineate the scope of any particular embodiment. Accordingly, the sole purpose of the following summary is to present certain concepts relating to one or more embodiments relating to the network-based DHCP server recovery techniques disclosed herein in a simplified form as a prelude to the more detailed description presented below.

According to various embodiments, one or more DHCP servers that fail or otherwise lose connectivity may recover existing Internet Protocol (IP) configuration information directly from an existing network configuration, which may eliminate or substantially reduce reliance on processes and resources needed to perform DHCP backups and restoration, eliminate or substantially reduce the need to plan and provision static IP configuration information into DHCP servers (whether standalone or redundant), eliminate or substantially reduce the possibility that stale DHCP data will exist upon recovery because the most accurate and most current data source (i.e., the network itself) provides the backup information that can be used to restore the DHCP database, and facilitate deploying "plug and play" network operations, administration, and management (OAM) models or migrating existing customer networks to "plug and play" network OAM models. Furthermore, the network-based DHCP server recovery techniques described herein may advantageously support, among other things, standalone, redundant, and hierarchical configurations whereby the recovering DHCP server may not need to communicate with every network element managed therewith in order to repopulate the IP configuration information or otherwise recover from failure, static (or "sticky") IP address configurations on certain network elements without needing to plan or otherwise provision the static IP configurations into the DHCP server because the DHCP server can automatically discover the static IP configurations through direct or indirect communication with the network elements, and generally simplified network operations, administration, and management (OAM) models that can gracefully and seamlessly recover from DHCP server failure in an automatic manner with minimal or no intervention.

According to various embodiments, to recover existing IP configuration information directly from an existing network in response to DHCP server failure, unique identifiers corresponding to hosts that a DHCP server provisioned with IP configuration information may be stored on the network in non-volatile memory such that current configuration information associated with the hosts may be obtained from the network in response to the DHCP server failure. For example, in a standalone deployment, messages may be sent to each host, which may respond with the current configuration information. In other scenarios, a summary node may provide summarized configuration information and messages may only be sent to hosts not included among the summarized configuration information, or configuration information may be synchronized among redundant DHCP servers such that messages may be sent to certain hosts based on differences between the configuration information on a mate DHCP server and a DHCP server recovering from failure.

According to one embodiment, a method for providing network-based DHCP server recovery may comprise, among other things, storing unique identifiers that correspond to one or more hosts in a network that a DHCP server has provisioned with Internet Protocol IP configuration information in non-volatile memory. In response to the DHCP server failing, DHCP configuration information currently present on the one or more hosts that correspond to the unique identifiers stored in the non-volatile memory may be obtained from the network, and a DHCP database associated with the DHCP server may then be repopulated based on the DHCP configuration information currently present on the one or more hosts.

According to one embodiment, a method for providing network-based DHCP server recovery may, in a standalone deployment, further comprise sending a configuration query message to each host that corresponds to a unique identifier stored in the non-volatile memory and receiving a response to the configuration query message from at least one host that corresponds to a unique identifier stored in the non-volatile memory, wherein the response to the configuration query message includes the DHCP configuration information currently present on the at least one host. In another embodiment, summarized DHCP configuration information may be received from a DHCP summary node, wherein the summarized DHCP configuration information may correspond to one or more hosts in a subnetwork managed with the DHCP summary node and the DHCP configuration information currently present on the one or more hosts may include the summarized DHCP configuration information received from the DHCP summary node.

According to one embodiment, a method for providing network-based DHCP server recovery may, in a redundant deployment in which a recovering DHCP server that provisions the IP configuration information to the one or more hosts in combination with a mate DHCP server, further comprise updating a local span of configuration list that includes the unique identifiers corresponding to the hosts that the recovering DHCP server has provisioned based on a mate span of configuration list received from the mate DHCP server in response to identifying one or more differences between the local span of configuration list and the mate span of configuration list. As such, configuration query messages may be sent to each host that corresponds to a unique identifier in the updated local span of configuration list and responses to the configuration query messages may include the DHCP configuration information currently present on one or more hosts that correspond to unique identifiers in the updated local span of configuration list. In another embodiment, the mate span of configuration list may be updated on the mate DHCP server based on the differences between the local and mate span of configuration lists in response to failure associated with the mate DHCP server. In still another embodiment, the recovering DHCP server and/or the mate DHCP server may receive summarized DHCP configuration information from a DHCP summary node, wherein the summarized DHCP configuration information may correspond to one or more hosts in a subnetwork managed with the DHCP summary node and include the DHCP configuration information currently present on the one or more hosts in the managed subnetwork.

According to one embodiment, a DHCP server recovering from failure may comprise non-volatile memory configured to store unique identifiers that correspond to one or more hosts in a network that the DHCP server has provisioned with IP configuration information and one or more processors configured to obtain DHCP configuration information currently present on the one or more hosts that correspond to the unique identifiers stored in the non-volatile memory from the network in response to the DHCP server failing. As such, the one or more processors may then repopulate a DHCP database associated with the DHCP server based on the DHCP configuration information currently present on the one or more hosts.

According to one embodiment, a computer-readable storage medium may have computer-executable instructions recorded thereon, wherein executing the instructions on a DHCP server may cause the DHCP server to store unique identifiers that correspond to one or more hosts in a network that the DHCP server has provisioned with IP configuration information in non-volatile memory, obtain DHCP configuration information currently present on the one or more hosts that correspond to the unique identifiers stored in the non-volatile memory from the network in response to the DHCP server failing, and repopulate a DHCP database associated with the DHCP server based on the DHCP configuration information currently present on the one or more hosts.

Other objects and advantages associated with the embodiments relating to the network-based DHCP server recovery techniques disclosed herein will be apparent to those skilled in the art based on the accompanying drawings and detailed description.

BRIEF DESCRIPTION OF THE DRAWINGS

The accompanying drawings are presented to aid in the description of the embodiments disclosed herein and are provided solely to illustrate exemplary features associated with the disclosed embodiments without defining any limitations thereof.

DETAILED DESCRIPTION

Figure 1:
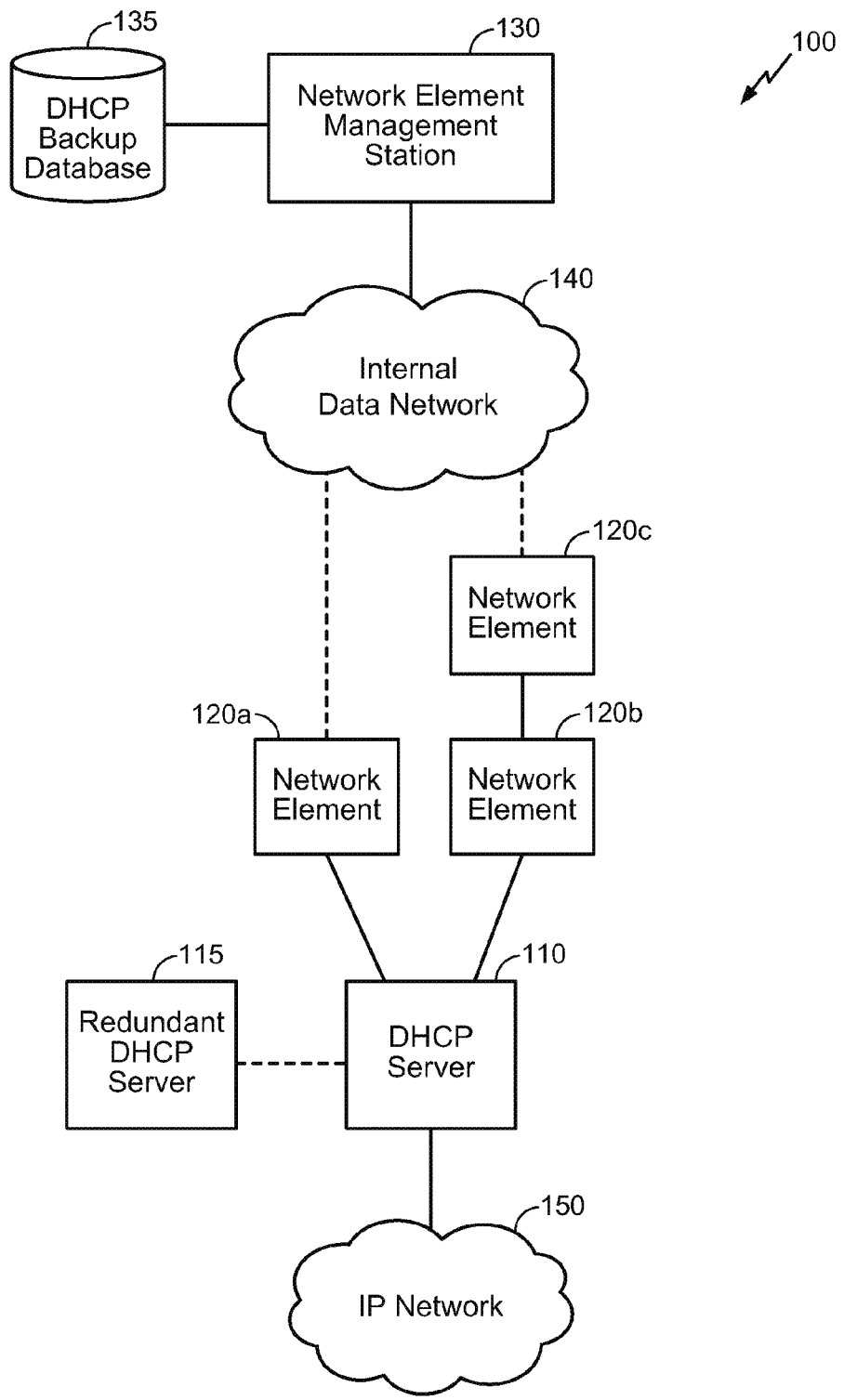
FIG. 1 illustrates a typical network architecture used to provide Dynamic Host Configuration Protocol (DHCP) server recovery.

Aspects are disclosed in the following description and related drawings to show specific examples relating to various exemplary embodiments relating to techniques that may provide network-based recovery when one or more Dynamic Host Configuration Protocol (DHCP) servers fail. However, alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is provided to describe particular embodiments only and is not intended to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

According to various embodiments, which will be described in further detail below, one or more DHCP servers that fail or otherwise lose connectivity may recover existing Internet Protocol (IP) configuration information directly from an existing network configuration. As such, the network-based DHCP server recovery techniques described herein may eliminate or substantially reduce reliance on processes and resources needed to perform DHCP backups and restoration, eliminate or substantially reduce the need to plan and provision static IP configuration information into DHCP servers (whether standalone or redundant), eliminate or substantially reduce the possibility that stale DHCP data will exist upon recovery because the most accurate and most current data source (i.e., the network itself) provides the backup information that can be used to restore the DHCP database, and facilitate deploying "plug and play" network operations, administration, and management (OAM) models or migrating existing customer networks to "plug and play" network OAM models. Furthermore, the network-based DHCP server recovery techniques described herein may advantageously support, among other things, standalone, redundant, and hierarchical configurations whereby the recovering DHCP server may not need to communicate with every network element managed therewith in order to repopulate the IP configuration information or otherwise recover from failure, static (or "sticky") IP address configurations on certain network elements without needing to plan or otherwise provision the static IP configurations into the DHCP server because the DHCP server can automatically discover the static IP configurations through direct or indirect communication with the network elements, and generally simplified network OAM models that can gracefully and seamlessly recover from DHCP server failure in an automatic manner with minimal or no intervention.

Figure 2:
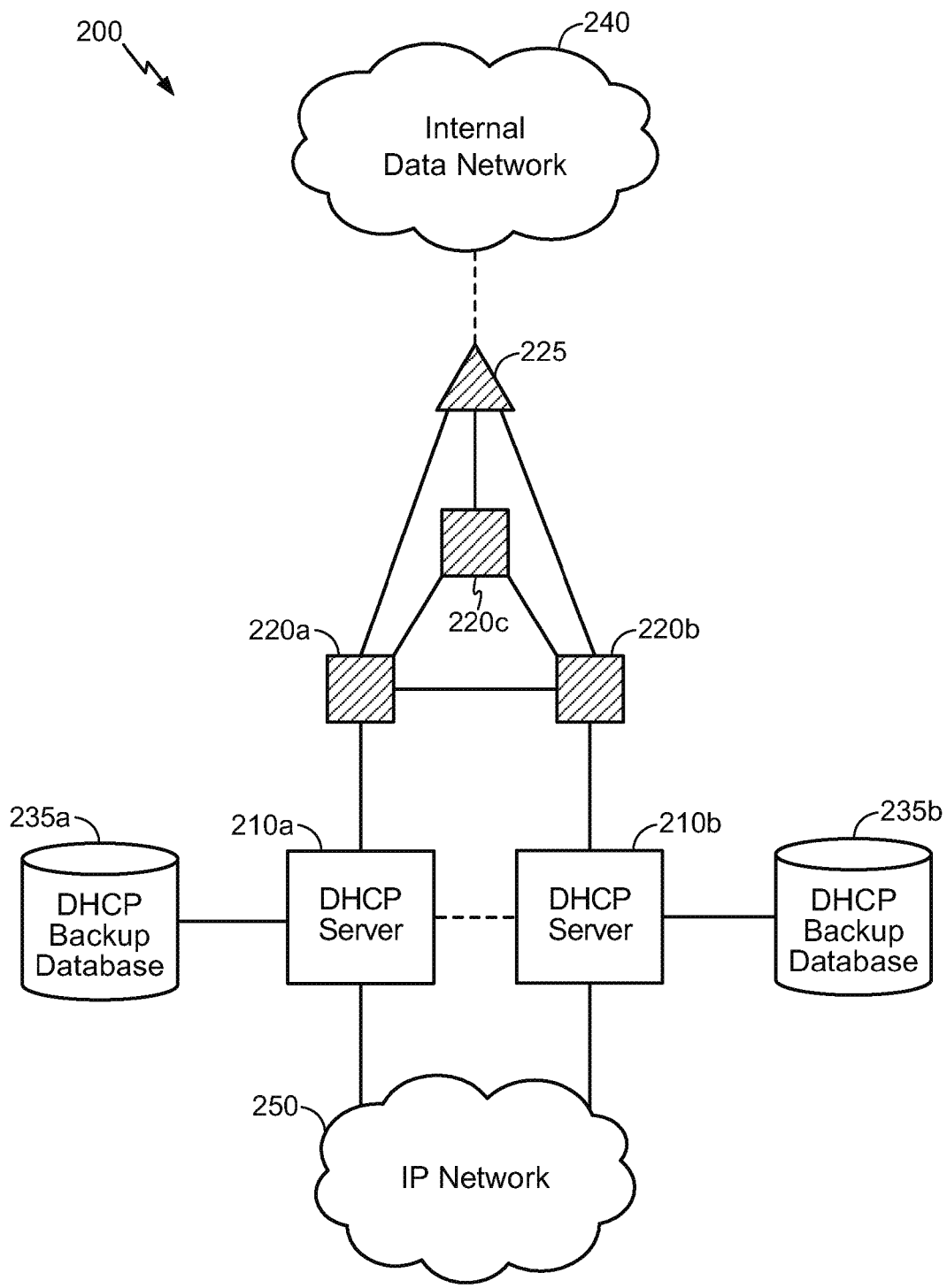
FIG. 2 illustrates an exemplary network architecture that can provide network-based DHCP server recovery, according to one exemplary embodiment.

For example, according to one embodiment, FIG. 2 illustrates an exemplary network architecture 200 that can provide network-based DHCP server recovery according to the techniques described in further detail herein. In general, the network architecture 200 shown in FIG. 2 may include one or more DHCP servers 210a-210b, which may be deployed in a standalone or redundant configuration. In particular, the redundant configuration may generally include multiple DHCP servers 210a-210b where each manages a single "span of configuration" that includes one or more subtending network elements, or the redundant configuration may alternatively (or additionally) include a primary DHCP server 210a that manages a single span of configuration and a mate DHCP server 210b that redundantly manages and assumes control over the same span of configuration in response to failure associated with the primary DHCP server 210a (i.e., the mate DHCP server 210b may represent a failover resource that communicates with the network elements in the span of configuration associated with the primary DHCP server 210a in response to failure associated therewith and/or returns control to the primary DHCP server 210a upon recovery). For example, in the particular deployment shown in FIG. 2, single-shelf network elements 220a, 220b, and 220c and multi-shelf network element 225 all have connections, either directly or indirectly, to DHCP servers 210a and 210b. On the other hand, in a standalone configuration, the network architecture 200 may include one DHCP server (e.g., DHCP server 210a or 210b) having a span of configuration that includes subtending single-shelf network elements 220a-220c and subtending multi-shelf network element 225. However, those skilled in the art will appreciate that other suitable standalone, redundant, or failover DHCP server configurations may be used.

In one embodiment, a particular DHCP server 210a and/or 210b deployed in the architecture 200 shown in FIG. 2 may be provisioned with a span of configuration name that defines the subtending network elements that the DHCP server 210a and/or 210b will manage (e.g., according to an "a.b.c.d" format) and the DHCP server 210 may then derive additional configuration information that will be used to manage the span of configuration. In particular, from the provisioned span of configuration name (e.g., "6.0.0.0"), the DHCP server 210a and/or 210b may derive an Open Shortest Path First (OSPF) area identifier (e.g., "6.0.0.0"), a reporting subnet name (e.g., "6.0.0.0"), one or more shelf private IP subnets that each span 512 addresses (e.g., "6.0.0.0" to "6.0.1.255"), a DHCP server private IP address (e.g., "6.0.0.1"), and if deployed in a redundant configuration, a secondary DHCP server private IP address (e.g., "6.0.2.1" to manage private IP subnet range "6.0.2.0" to "6.0.3.255"). As such, in response to the DHCP server 210a and/or 210b discovering a particular network element among network elements 220a-220c and network element 225, the DHCP server 210a and/or 210b may provide an IP configuration to the discovered network element. More particularly, the DHCP server 210a and/or 210b may provision the discovered network element with a Target Identifier (TID) that uniquely identifies the node in a routing domain associated with the OSPF area, a routable IP address, subnet mask, and gateway in an internal data network 240 and/or an IP network 250, and the span of configuration name, among other IP configuration information.

In one embodiment, a DHCP server 210a and/or 210b (whether in a standalone or redundant deployment) may automatically discover a particular network element among single-shelf network elements 220a-220c and multi-shelf network element 225 in response to receiving a DHCP configuration request from the network element and subsequently responds to the DHCP configuration request with the above-mentioned IP configuration information. The discovered network element may then use the provisioned IP configuration information to connect to the OAM network (e.g., internal data network 240, IP network 250, etc.) and become a DHCP relay node to service DHCP requests from DHCP client devices located on internal data network 240. As such, when the network element subsequently receives a DHCP configuration request from a neighbor node (e.g., another network element or a DHCP client device), the network element configured to be the DHCP relay node may forward appropriate IP configuration information from the DHCP server 210a and/or 210b to the neighbor node. In this manner, DHCP client devices located on the internal data network 240 may connect to the DHCP server 210a and/or 210b via the subtending single-shelf network elements 220a-220c and/or the multi-shelf network element 225, which in turn connect to the DHCP server 210a and/or 210b to relay IP configuration information between the DHCP client devices and the DHCP server 210a and/or 210b.

For example, in one embodiment, an exemplary automatic DHCP discovery and provisioning sequence that may be performed in the architecture shown in FIG. 2 may include the multi-shelf network element 225 sending a DHCP configuration request to the DHCP server 210a and/or 210b, which may then respond to the request with IP configuration information that the multi-shelf network element 225 may use to connect to the OAM network and become a DHCP relay node, whereby the multi-shelf network element 225 may essentially become a DHCP server that services DHCP configuration requests from single-shelf network elements 220a-220c and/or DHCP client devices on the internal data network 240. In a similar respect, one or more of the single-shelf network elements 220a-220c may use IP configuration information that the multi-shelf network element 225 provides thereto as the DHCP relay node that responds to DHCP configuration requests, whereby the one or more of the single-shelf network elements 220a-220c may become further DHCP relay nodes. Accordingly, the DHCP client devices on the internal data network 240 may generally connect to any of the multi-shelf network element 225 or the single-shelf network elements 220a-220c that were configured to become DHCP relay nodes in order to indirectly receive IP configuration information from the DHCP server 210a and/or 210b via the subtending multi-shelf network element 225 and/or the subtending single-shelf network elements 220a-220c that may have become DHCP relay nodes.

Consequently, any failure associated with the DHCP servers 210a-210b and/or the multi-shelf network element 225 and/or the single-shelf network elements 220a-220c that have become DHCP relay nodes may cause communication problems in the internal data network 240. As such, for simplicity, the subsequent discussion may simply refer to the "DHCP server node" in relation to the network-based DHCP recovery techniques described herein. However, because the network architecture may include a standalone DHCP server 210, redundant DHCP servers 210a and 210b, and/or various network elements 220a-220c and 225 that may be configured to behave as DHCP relay nodes, those skilled in the art will appreciate that the "DHCP server node" referred to herein may suitably refer to any one or more of DHCP server 210a, DHCP server 210b, and/or network elements 220a-220c and 225 configured to become DHCP relay nodes.

For example, in one embodiment, subsequent to providing the above-mentioned IP configuration information to a particular network element or other host, the provisioning DHCP server node may add the TID provisioned to the host to a "span of configuration" list that encompasses all TIDs in the local network that the DHCP server node has configured. Furthermore, the DHCP server node may store the span of configuration list in non-volatile memory (e.g., DHCP backup database 235) that can retain the IP configuration information contained therein in the event that the DHCP server node may fail. Accordingly, when a DHCP server node deployed in a standalone configuration fails and subsequently comes back online, the recovering DHCP server node may consult the span of configuration list stored within the non-volatile memory and send requests to retrieve the DHCP configuration information currently present on each host that may be enumerated in the span of configuration list. Accordingly, the DHCP server node may repopulate the IP configuration information in the DHCP database with the DHCP configuration that each host in the span of configuration list returns to the DHCP server node, which may ensure that the currently configured network elements will receive the same IP configuration information in response to a restart or lease expiration. Further detail relating to the network-based DHCP server recovery techniques that may be used in redundant configurations will be described in further detail below with respect to FIGS. 4 and 6).

In another embodiment, if deployed in a redundant configuration, recovering a DHCP server node that has failed (e.g., DHCP server 210a) may not depend entirely on the integrity associated with the DHCP backup database maintained at the mate DHCP server (e.g., DHCP server 210b). Rather, the recovering DHCP server node may simply update the span of configuration list stored in the local DHCP backup database (e.g., DHCP backup database 235a) with one or more deltas, if any, that represent differences between the local DHCP backup database and the mate DHCP backup database (e.g., DHCP backup database 235b) and proceed to recover the local DHCP backup database from the existing network in a similar manner to that described above with respect to the standalone configuration (e.g., sending requests to each host enumerated in the span of configuration list after synchronization with the mate DHCP backup database and then repopulating the IP configuration information in the local DHCP database with DHCP configuration that each host in the span of configuration list returns to the DHCP server node). Further detail relating to the network-based DHCP server recovery techniques that may be used in standalone configurations will be described in further detail below in relation to FIGS. 3 and 5).

Figure 3:
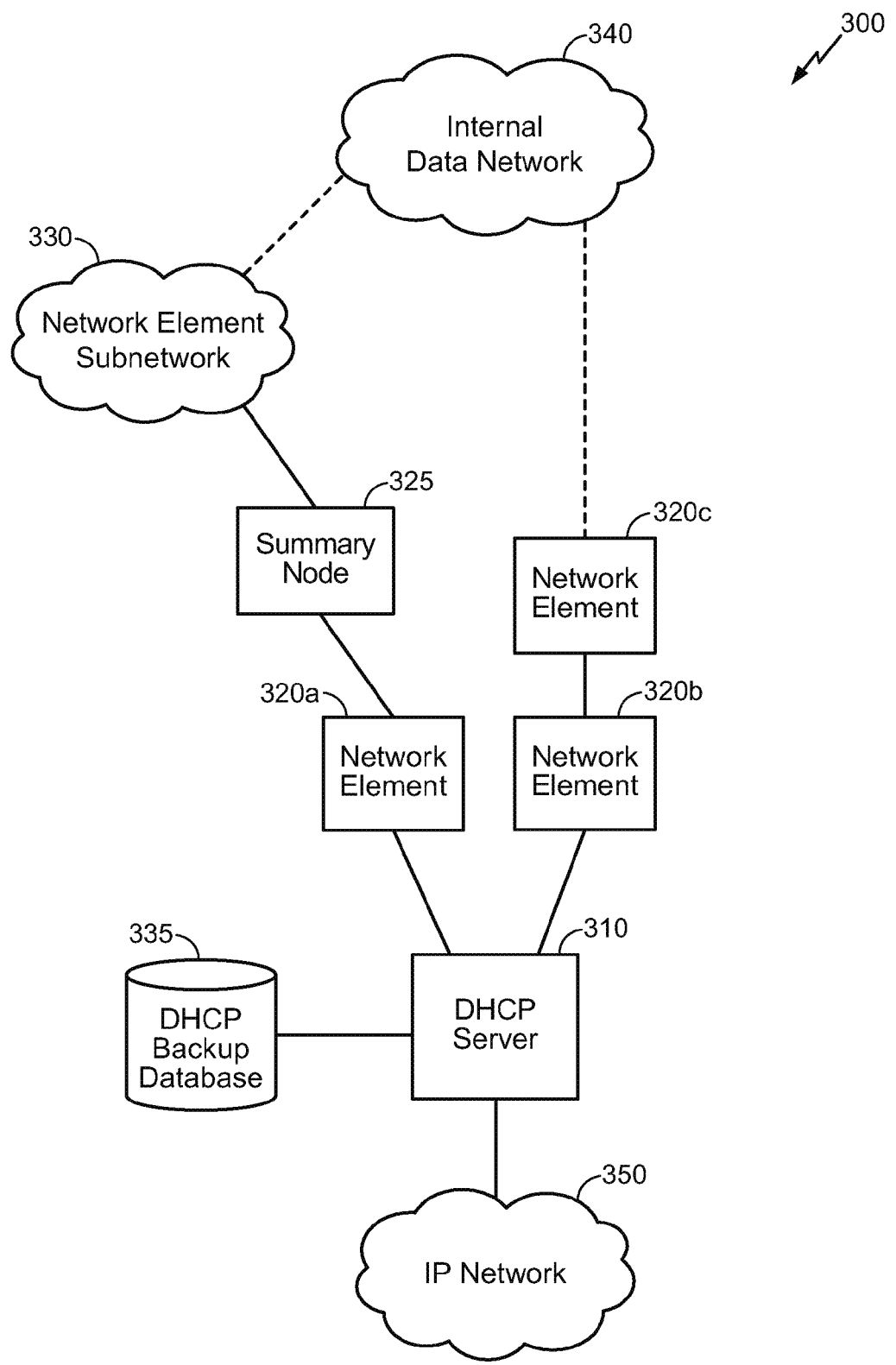
FIG. 3 illustrates an exemplary network architecture that can provide network-based DHCP server recovery in a standalone DHCP server deployment, according to one exemplary embodiment.

According to one embodiment, FIG. 3 illustrates an exemplary network architecture 300 that can be used to provide network-based DHCP server recovery in a standalone DHCP server deployment. In general, the network architecture 300 shown in FIG. 3 may include various components that are substantially similar or identical to the network architecture 200 shown in FIG. 2 and described in further detail above, including a DHCP server 310 configured to service DHCP configuration requests from various network elements 320a-320c or other network hosts and store a span of configuration list that encompasses each TID that the DHCP server 310 has provisioned to any network element 320a-320c or other host in non-volatile memory associated with a DHCP backup database 335. As such, to maintain brevity and simplify the following description relating to the network-based DHCP server recovery techniques that may be used in a standalone deployment, various details relating to certain components or functionalities in the network architecture 300 shown in FIG. 3 may be omitted to the extent that the same or substantially similar details have been provided above in relation to the network architecture 200 shown FIG. 2.

In one embodiment, the network architecture 300 may include a standalone DHCP server 310 that may be provisioned with a span of configuration that defines one or more subtending network elements 320a-320c and one or more subtending network elements arranged in a network element subnetwork 330, which may have IP configuration information provisioned from the DHCP server 310. Additionally, in one embodiment, the DHCP server 310 may derive additional configuration information that will be used to manage the subtending network elements 320a-320c and the subtending network elements in the network element subnetwork 330 within the span of configuration. In particular, from the provisioned span of configuration, the DHCP server 310 may derive an OSPF area identifier that defines a routing domain associated with the span of configuration, a reporting subnet name, one or more 512-address wide shelf private IP subnets, and a private IP address associated with the DHCP server 310. As such, in response to the DHCP server 310 discovering a particular network element among network elements 320a-320c and/or in the network element subnetwork 330, the DHCP server 310 may provide an IP configuration to the discovered network element. More particularly, the DHCP server 310 may provision the discovered network element with a TID that uniquely identifies the node in the routing domain defined with the OSPF area, a routable IP address, subnet mask, and gateway in an internal data network 340 and/or an IP network 350, and the span of configuration name, among other IP configuration information.

In one embodiment, the DHCP server 310 may automatically discover and provision a particular network element among network elements 320a-320c and/or in the network element subnetwork 330 with appropriate IP configuration information in response to receiving a DHCP configuration request from the network element. In one embodiment, the provisioning DHCP server 310 may then add a TID included in the IP configuration information provisioned to the network element to a span of configuration list that encompasses every TID that the DHCP server 310 has configured. Furthermore, the DHCP server 310 may be coupled to a DHCP backup database 335 that includes non-volatile memory to store the span of configuration list, wherein the non-volatile memory may retain the IP configuration information (including the TID that the DHCP server 310 has provisioned to each host) in the event that the DHCP server 310 may lose connectivity or otherwise fail. Accordingly, when the DHCP server 310 loses connectivity or otherwise fails and subsequently comes back online, the recovering DHCP server 310 may retrieve the span of configuration list from the non-volatile memory and send a single configuration query message to each network element 320a-320c associated with a TID enumerated in the span of configuration list. In one embodiment, each network element 320a-320c that receives the configuration query message from the DHCP server 310 may then individually respond to the configuration query message with DHCP configured profile information currently present on the network element 320a-320c. As such, the DHCP server 310 may then repopulate the DHCP database 335 with the current DHCP configured profile information received from each individual network element 320a-320c and thereby ensure that currently configured network elements 320a-320c will receive the same IP configuration information in response to a restart, lease expiration, or other change in IP configuration status. Furthermore, in one embodiment, the DHCP server 310 may optionally provision new IP configuration information to one or more network elements 320a-320c associated with a TID in the span of configuration list that did not respond to the configuration query message or in response to otherwise determining that current DHCP configuration information associated therewith cannot be obtained from the network. However, those skilled in the art will appreciate that the DHCP server 310 may alternatively not provision any new IP configuration information to network elements that did not respond to the configuration query message when recovering from a failure (e.g., because the non-responding network elements may have gone offline).

In one embodiment, the network architecture 300 shown in FIG. 3 may further include a DHCP summary node 325 that may provide hierarchical scalability to support recovering the DHCP server 310 in response to failure. For example, in one embodiment, the DHCP summary node 325 may operate in accordance with conventional OSPF protocols and treat the network element subnetwork 330 as an OSPF area that the DHCP summary node 325 hosts, and treating an area linking the DHCP summary node 325 to the DHCP server 310 as a virtual back-bone area through which summarized DHCP configuration information associated with the network element subnetwork 330 may be sent and received. As such, in one embodiment, the DHCP summary node 325 may generally summarize the DHCP configuration information associated with any network elements in network element subnetwork 330 (e.g., IP addresses reachable in the network element subnetwork 330 and corresponding DHCP configuration profiles) and report the summarized DHCP configuration information to the DHCP server 310 (e.g., through network element 320a). Furthermore, in one embodiment, the DHCP summary node 325 may report the summarized DHCP configuration information to any other hosts that are connected to the network element subnetwork 330 and have configurations to operate as DHCP relay nodes (e.g., network elements 320a-320c, etc). Additionally, although FIG. 3 shows one network element subnetwork 330 connected to one DHCP summary node 325, those skilled in the art will appreciate that the architecture may be hierarchically scalable to support multiple network element subnetworks 330 connected to multiple DHCP summary nodes 325 that report respective summarized DHCP configuration information associated with the connected network element subnetworks 330 to the DHCP server 310 and/or DHCP relay nodes.

In one embodiment, when the network architecture 300 includes the DHCP summary node 325, the DHCP server 310 may therefore recover from failure without necessarily having to communicate with every network element deployed therein. More particularly, the DHCP server 310 may initially repopulate the DHCP backup database 335 with the summarized DHCP configuration information reported from the DHCP summary node 325, whereby the DHCP server 310 may not have to send configuration query messages to any network elements in the network element subnetwork 330 that correspond to a TID stored in the span of configuration list. Instead, the DHCP server 310 may only send the configuration query message to any network elements that are not deployed in the network element subnetwork 330 and correspond to a TID stored in the span of configuration list and any network elements deployed in the subnetwork 330 that were not included in the summarized DHCP configuration information reported from the DHCP summary node 325 and correspond to a TID stored in the span of configuration list. Accordingly, the DHCP summary node 325 may reduce how many configuration query messages need to be sent to repopulate the DHCP backup database 335 and reduce the time needed to repopulate the DHCP backup database 335 in a manner that provides increased scalability with increased network growth.

Figure 4:
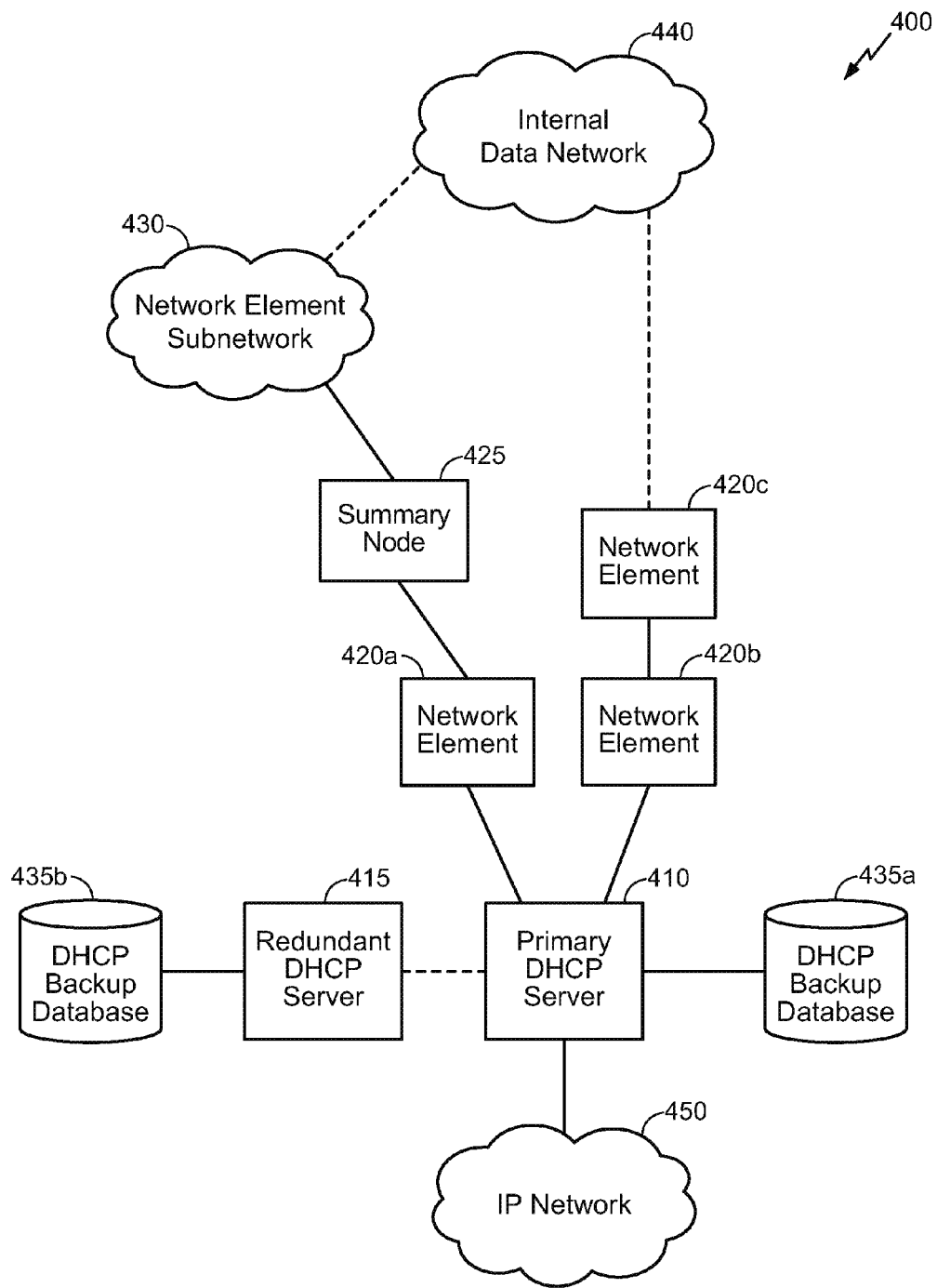
FIG. 4 illustrates an exemplary network architecture that can provide network-based DHCP server recovery in a redundant DHCP server deployment, according to one exemplary embodiment.

According to one embodiment, FIG. 4 illustrates an exemplary network architecture that can provide network-based DHCP server recovery in a redundant DHCP server deployment. In general, the network architecture 400 shown in FIG. 4 may include various components that are substantially similar or identical to the network architecture 200 shown in FIG. 2 and the network architecture 300 shown in FIG. 3. As such, to maintain brevity and simplify the following description relating to the network-based DHCP server recovery techniques that may be used in a redundant deployment, various details relating to certain components or functionalities in the network architecture 400 shown in FIG. 4 may be omitted to the extent that the same or substantially similar details have been provided above in relation to the network architecture 200 shown FIG. 2 and/or the network architecture 300 shown FIG. 3.

In one embodiment, the network architecture 400 may include a primary DHCP server 410 and a redundant DHCP server 415 that may be provisioned with the same span of configuration in a load balancing configuration and/or a failover configuration, wherein the span of configuration provisioned to the primary DHCP server 410 and the redundant DHCP server 415 may define one or more subtending network elements 420a, 420b, 420c and subtending network elements arranged in a network element subnetwork 430. Additionally, in one embodiment, the primary DHCP server 410 and/or the redundant DHCP server 415 may derive additional configuration information that will be used to manage the subtending network elements 420a-420c and the subtending network elements in the subnetwork 430 (e.g., an OSPF area identifier, a reporting subnet name, one or more shelf private IP subnets, a private IP address associated with the primary DHCP server 410, and a secondary private IP address associated with a redundant DHCP server 415). As such, in the load balancing configuration, subtending network elements 420a-420c may send DHCP configuration requests to either the primary DHCP server 410 or the redundant DHCP server 415, which may then appropriately respond to the DHCP configuration requests with an IP configuration that includes, among other things, a TID that uniquely identifies the requesting network element, and routable IP configuration information that can be used to communicate with other devices located in an internal data network 440 and/or an IP network 450. On the other hand, in the failover configuration, the subtending network elements 420a-420c may generally send DHCP configuration requests to the primary DHCP server 410 while available, or alternatively to the redundant DHCP server 415 when the primary DHCP server 410 fails or otherwise becomes unavailable. As such, depending on whether the primary DHCP server 410 or the redundant DHCP server 415 presently has the responsibility to service the DHCP configuration requests, the appropriate DHCP server may then respond to the DHCP configuration requests with the above-mentioned IP configuration. Furthermore, although FIG. 4 shows one primary DHCP server 410 and one redundant DHCP server 415, those skilled in the art will appreciate that other suitable configurations may be employed (e.g., multiple primary DHCP servers 410 that service the same span of configuration in a load balanced configuration and one or more redundant DHCP servers 415 that assume responsibility over the span of configuration when one or more primary DHCP servers 410 fail or otherwise become unavailable).

In one embodiment, in response to the primary DHCP server 410 and/or the redundant DHCP server 415 discovering a particular network element in the span of configuration associated therewith and provisioning the discovered network element with appropriate IP configuration information, the provisioning DHCP server may then add a TID included in the IP configuration information provisioned to the network elements 420a-420c to a span of configuration list that encompasses every TID that the provisioning DHCP server has configured. For example, in one embodiment, the primary DHCP server 410 may be coupled to a DHCP backup database 435*a* that includes non-volatile memory to store the span of configuration list associated therewith and the redundant DHCP server 415 may be coupled to a similar DHCP backup database 435*b* that includes non-volatile memory to store the span of configuration list associated therewith, whereby the non-volatile memories may retain the IP configuration information that each respective DHCP server has provisioned to each network element 420*a*-420*c* or other host in the network (including the TID that the respective DHCP server has provisioned to each network element or host) in the event that the primary DHCP server 410 and/or the redundant DHCP server 415 may lose connectivity or otherwise fail. Furthermore, in one embodiment, different network-based DHCP server recovery techniques may be used in the redundant deployment shown in FIG. 4 depending on whether multiple DHCP servers fail (e.g., when primary DHCP server 410 and redundant DHCP server 415 both fail) or whether one DHCP server fails (e.g., when either the primary DHCP server 410 or the redundant DHCP server 415 fails). However, in either case, recovering from failure associated with one or more of primary DHCP server 410 or redundant DHCP server 415 failing may not depend entirely on the integrity associated with the DHCP backup database 435*a* and/or 435*b* maintained at the mate DHCP server.

For example, in one embodiment, when either the DHCP server 410 or the redundant DHCP server 415 loses connectivity or otherwise fails and subsequently comes back online, the recovering DHCP server (i.e., the DHCP server that failed and came back online) may retrieve the local span of configuration list from non-volatile memory and send a request to retrieve the span of configuration list from the mate server DHCP (i.e., the DHCP server that did not experience a disruption in service). In one embodiment, the mate DHCP server may then reply with the span of configuration list stored in the non-volatile memory associated therewith and the recovering DHCP server may compare the local span of configuration list with the mate span of configuration list. In response to identifying one or more deltas or other differences between the local span of configuration list and the mate span of configuration list, the recovering DHCP server may update the local span of configuration list with the identified deltas or differences prior to sending configuration query messages to each network element 420*a*-420*c* associated with a TID enumerated in the updated span of configuration list. In one embodiment, each network element 420*a*-420*c* that receives the configuration query message from the recovering DHCP server may then respond to the configuration query message with DHCP configured profile information currently present on the network element, whereby the recovering DHCP server may then repopulate the local DHCP backup database 435*a* and/or 435*b* with the current DHCP configured profile information received from each individual network element 420*a*-420*c*. Furthermore, in one embodiment, the recovering DHCP server may optionally provision new IP configuration information to one or more network elements 420*a*-420*c* that did not respond to the configuration query message or alternatively not provision new IP configuration information to network elements 420*a*-420*c* that did not respond to the configuration query message when recovering from a failure.

Alternatively, when the primary DHCP server 410 and the redundant DHCP server 415 both lose connectivity or otherwise fail and one or more of the primary DHCP server 410 or the redundant DHCP server 415 subsequently come back online, either the primary DHCP server 410 or the redundant DHCP server 415 may become a recovering DHCP server and proceed to perform network-based recovery on both the primary DHCP server 410 and the redundant DHCP server 415. For example, in one embodiment, the recovering DHCP server may retrieve the local span of configuration list from non-volatile memory and the mate span of configuration list stored in the non-volatile memory associated with the mate DHCP server, wherein the recovering DHCP server may then compare the local and mate span of configuration lists to identify any deltas or other differences. In one embodiment, the recovering DHCP server may then update the span of configuration lists on both the primary DHCP server 410 and the redundant DHCP server 415 (and any other deployed DHCP servers that may have failed) with the identified deltas or differences. In one embodiment, the mate DHCP server may then reply to the recovering DHCP server (e.g., to confirm that the mate DHCP server has come back online and that the span of configuration list associated therewith has been appropriately updated), and the primary DHCP server 410 and the redundant DHCP server 415 may then send configuration query messages to each network element 420*a*-420*c* associated with a TID enumerated in the updated span of configuration lists and repopulate the respective DHCP backup databases 435*a*-435*b* with current DHCP configured profile information associated with each network element 420*a*-420*c*.

In one embodiment, the network architecture 400 shown in FIG. 4 may further include a DHCP summary node 425 that may provide hierarchical scalability to support recovering the primary DHCP server 410 and/or the redundant DHCP server 415 in both the single failure and multiple failure scenarios described above. More particularly, the DHCP summary node 425 may generally operate in accordance with the same or substantially similar techniques described above in relation to FIG. 3 in order to reduce how many configuration query messages need to be sent to repopulate the DHCP databases 435*a* and 435*b* and thereby reduce the time needed to repopulate the DHCP databases 435*a* and 435*b* in a manner that provides increased scalability with increased network growth. For example, as described in further detail above with respect to FIG. 3, the DHCP summary node 425 may generally summarize DHCP configuration information associated with any network elements 420*a*-420*c* in network element subnetwork 430 and report the summarized DHCP configuration information to the recovering DHCP server(s) (e.g., through network element 420*a*), which may then recover from the DHCP server failure without having to communicate with every network element 420*a*-420*c* deployed in the network. More particularly, the DHCP databases 435*a* and/or 435*b* may initially be repopulated with the summarized DHCP configuration information reported from the DHCP summary node 425 and the recovering DHCP server(s) may then send configuration query messages to any network elements 420*a*-420*c* that correspond to a TID stored in the updated span of configuration list that has not already been updated with the summarized DHCP configuration information reported from the DHCP summary node. As such, the DHCP summary node 425 may provide hierarchical scalability to the network-based DHCP server recovery techniques used in redundant configurations in a similar manner to the hierarchical scalability that may be provided in standalone configurations.

Figure 5:
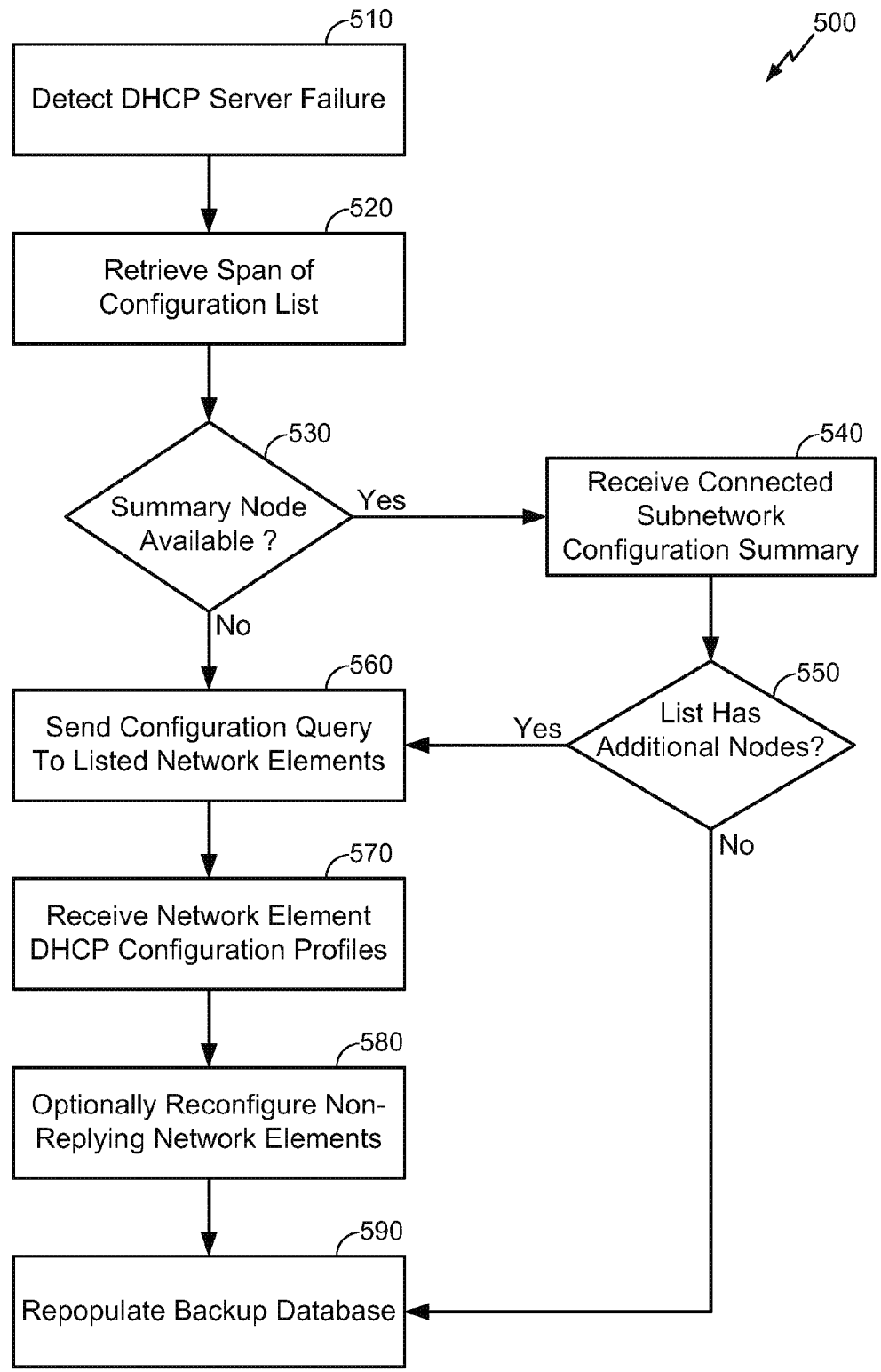
FIG. 5 illustrates an exemplary method to recover from failure associated with a standalone DHCP server, according to one exemplary embodiment.

According to one embodiment, FIG. 5 illustrates an exemplary method 500 to recover from failure associated with a standalone DHCP server. More particularly, in one embodiment, the method 500 may be initiated in response to detecting that a standalone DHCP server has lost connectivity or otherwise failed at block 510, wherein the recovering DHCP server may then retrieve a span of configuration list from local non-volatile memory at block 520 in response to subsequently coming back online. In one embodiment, the recovering DHCP server may then determine whether the network has an available DHCP summary node at block 530. In response to determining that the network has an available DHCP summary node, the recovering DHCP server may receive summarized DHCP configuration information associated with any network elements in a network element subnetwork managed with the DHCP summary node at block 540. For example, in one embodiment, the connected subnetwork DHCP configuration summary may include IP addresses reachable in the subnetwork connected to the DHCP summary node and/or other suitable DHCP configuration profile information. As such, when the network includes the DHCP summary node, the recovering DHCP server may recover from failure without necessarily having to communicate with every network element deployed therein. Instead, the recovering DHCP server may determine whether the span of configuration list includes any additional nodes or network elements that were not included among the connected subnetwork DHCP configuration summary received from the DHCP summary node at block 550, wherein the recovering DHCP server may simply repopulate the DHCP backup database with the connected subnetwork DHCP configuration summary at block 590 if the connected subnetwork DHCP configuration summary included every node or network element having a TID in the span of configuration list.

Alternatively, in response to determining that the span of configuration list includes one or more additional nodes or network elements that were not included among the DHCP configuration summary received from the DHCP summary node at block 550, or in response to determining that the network does not include an available DHCP summary node, the recovering DHCP server may send a configuration query message to each network element associated with a TID enumerated in the span of configuration list at block 560. In one embodiment, each network element that receives the configuration query message from the DHCP server may then respond to the configuration query message with DHCP configured profile information currently present on the network element at block 570. Furthermore, if the recovering DHCP server determines that one or more network elements associated with a TID included in the span of configuration list did not respond to the configuration query message with current DHCP configured profile information, the recovering DHCP server may optionally reconfigure the non-replying network elements at block 580. However, those skilled in the art will appreciate that the recovering DHCP server may alternatively not provision new IP configuration information to the non-replying network elements at block 580 when recovering from a failure (e.g., because the non-responding network elements may have gone offline). In either case, the recovering DHCP server may then repopulate the DHCP database at block 590 with the current DHCP configured profile information received at block 570, any DHCP configured profile information received at block 540, and/or any new IP configuration information provisioned at block 580. As a result, the standalone DHCP server may recover from failure in a manner that ensures currently configured network elements will receive the same IP configuration information in response to a restart, lease expiration, or other change in IP configuration status.

Figure 6:
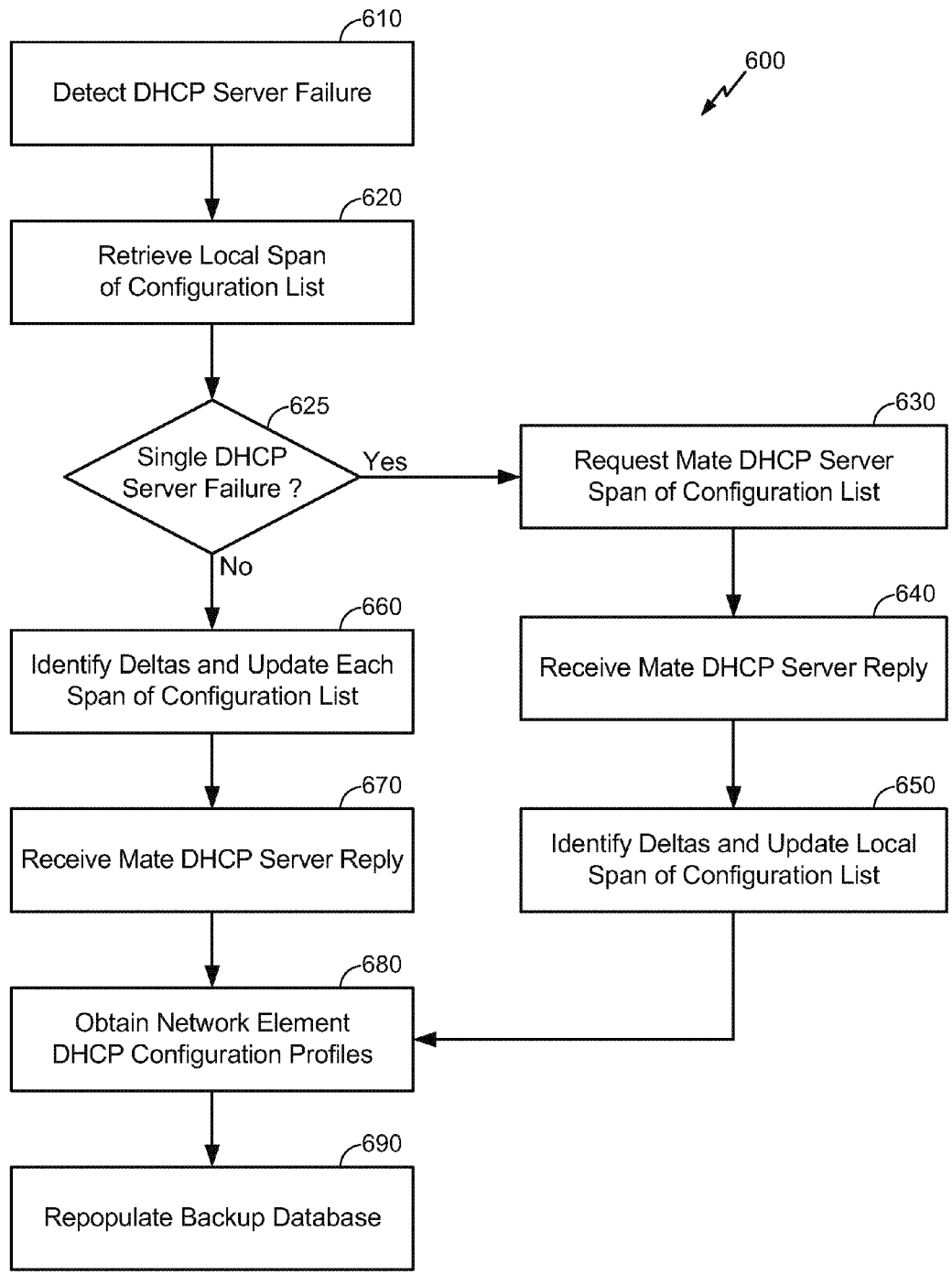
FIG. 6 illustrates an exemplary method to recover from failure associated with one or more redundant DHCP servers, according to one exemplary embodiment.

According to one embodiment, FIG. 6 illustrates an exemplary method 600 to recover from failure associated with one or more redundant DHCP servers. More particularly, in one embodiment, the method 600 may be initiated in response to detecting that one or more redundant DHCP servers have lost connectivity or otherwise failed at block 610, wherein the recovering DHCP server may then retrieve a local span of configuration list from local non-volatile memory at block 620 in response to subsequently coming back online. In one embodiment, the recovering DHCP server may then determine whether a mate DHCP server also lost connectivity or otherwise failed or only the recovering DHCP server failed at block 625. In response to determining that a single DHCP server failed, the recovering DHCP server (i.e., the DHCP server that failed and came back online) may request the mate span of configuration list from the mate server DHCP that did not have a disruption in service at block 630. In one embodiment, a reply that includes the mate span of configuration list stored in the non-volatile memory associated with the mate DHCP server may then be received from the mate DHCP server at block 640 and the recovering DHCP server may compare the local and mate span of configuration lists at block 650.

In one embodiment, in response to identifying one or more deltas or other differences between the local and mate span of configuration lists, the recovering DHCP server may update the local span of configuration list with the identified deltas or differences at block 650 prior to sending configuration query messages to each network element associated with a TID enumerated in the updated span of configuration list at block 680 in order to obtain DHCP configuration profiles associated with each network element (e.g., DHCP configuration information currently present on each network element). Furthermore, in one embodiment, the network element DHCP configuration profiles obtained at block 680 may include summarized DHCP configuration information received from the DHCP summary node that manages network elements in a network element subnetwork, in which case the configuration query messages may not be sent to any network elements that were included among the summarized DHCP configuration information received from the DHCP summary node. In one embodiment, each network element that receives the configuration query message from the recovering DHCP server may then respond to the configuration query message with DHCP configured profile information currently present on the network element, whereby the recovering DHCP server may then repopulate the local DHCP database with the current DHCP configured profile information received from each individual network element at block 690. Furthermore, in one embodiment, the recovering DHCP server may optionally provision new IP configuration information to one or more network elements that did not respond to the configuration query message at block 690, or the recovering DHCP server may alternatively not provision new IP configuration information to the non-replying network elements at block 690.

Returning to block 625, in response to determining that multiple DHCP servers failed, a DHCP server that failed and subsequently came back online may become a recovering DHCP server and proceed to perform network-based recovery on each DHCP server that failed. For example, in one embodiment, the recovering DHCP server may retrieve the mate span of configuration list stored in the non-volatile memory associated with the mate DHCP server, which may then be compared to the local span of configuration list retrieved at block 620 to identify any deltas or other differences at block 660. In one embodiment, the recovering DHCP server may then update the span of configuration lists on each DHCP server that failed at block 660. In one embodiment, the mate DHCP server may then reply to the recovering DHCP server at block 670 (e.g., to confirm that the mate DHCP server has come back online and that the span of configuration list associated therewith has been appropriately updated), and the multiple DHCP servers may then send configuration query messages to each network element associated with a TID enumerated in the updated span of configuration lists at block 680. Furthermore, in one embodiment, the network element DHCP configuration profiles obtained at block 680 may similarly include summarized DHCP configuration information received from a DHCP summary node, in which case the configuration query messages may not be sent to any network elements that were included among the summarized DHCP configuration information. As such, the multiple DHCP servers may then repopulate respective DHCP databases with current DHCP configured profile information at block 690 in a generally similar manner to that described above in the scenario where a single DHCP server failed.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To clearly illustrate this interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative embodiments that may be used to provide network-based DHCP server recovery, those skilled in the pertinent art will appreciate that various changes and modifications could be made herein without departing from the scope or spirit of the disclosure, as defined by the appended claims. The functions, steps, operations, and/or actions of the method claims in accordance with the embodiments disclosed herein need not be performed in any particular order. Furthermore, although elements of the aspects and embodiments disclosed herein may be described or claimed in the singular, the plural is contemplated unless limitation to the singular is explicitly stated.

What is claimed is:

1. A method for providing network-based Dynamic Host Configuration Protocol (DHCP) server recovery, comprising:
   storing unique identifiers that correspond to one or more hosts in a network that a DHCP server has provisioned with Internet Protocol (IP) configuration information in non-volatile memory, wherein the unique identifiers uniquely identify the one or more hosts in a routing domain associated with an Open Shortest Path First (OSPF) area, a routing IP address, a subnet mask, and a gateway, wherein the DHCP server provisions the IP configuration information to the one or more hosts in a standalone deployment;

obtaining, from the network, DHCP configuration information currently present on the one or more hosts that correspond to the unique identifiers stored in the non-volatile memory in response to the DHCP server failing;

repopulating a DHCP database associated with the DHCP server based on the DHCP configuration information currently present on the one or more hosts;

sending a configuration query message to each host that corresponds to a unique identifier stored in the non-volatile memory; and receiving a response to the configuration query message from at least one host that corresponds to a unique identifier stored in the non-volatile memory, wherein the response to the configuration query message includes the DHCP configuration information currently present on the at least one host.

2. The method recited in claim 1, further comprising:

receiving, from a DHCP summary node, summarized DHCP configuration information that corresponds to one or more hosts in a subnetwork managed with the DHCP summary node, wherein the DHCP configuration information currently present on the one or more hosts includes the summarized DHCP configuration information received from the DHCP summary node.

3. The method recited in claim 1, wherein the DHCP server comprises a recovering DHCP server that provisions the IP configuration information to the one or more hosts in combination with a mate DHCP server in a redundant deployment, wherein the mate DHCP server is a failover resource that communicates for the DHCP server in response to a failure associated therewith.

4. The method recited in claim 3, wherein obtaining the DHCP configuration information currently present on the one or more hosts comprises:

updating a local span of configuration list that includes the unique identifiers corresponding to the hosts that the recovering DHCP server has provisioned based on a mate span of configuration list received from the mate DHCP server in response to identifying one or more differences between the local span of configuration list and the mate span of configuration list;

sending a configuration query message to each host that corresponds to a unique identifier in the updated local span of configuration list; and receiving a response to the configuration query message from at least one host that corresponds to a unique identifier in the updated local span of configuration list, wherein the response to the configuration query message includes the DHCP configuration information currently present on the at least one host.

5. The method recited in claim 4, wherein obtaining the DHCP configuration information currently present on the one or more hosts further comprises:

updating the mate span of configuration list on the mate DHCP server based on the one or more differences between the local span of configuration list and the mate span of configuration list in response to mate DHCP server failing.

6. The method recited in claim 3, further comprising:

receiving, from a DHCP summary node, summarized DHCP configuration information that corresponds to one or more hosts in a subnetwork managed with the DHCP summary node, wherein the DHCP configuration information currently present on the one or more hosts includes the summarized DHCP configuration information received from the DHCP summary node.

7. The method recited in claim 1, further comprising:

receiving, from a DHCP summary node, summarized DHCP configuration information that corresponds to one or more hosts in a subnetwork managed with the DHCP summary node, wherein the DHCP configuration information currently present on the one or more hosts includes the summarized DHCP configuration information received from the DHCP summary node.

8. The method recited in claim 1, wherein obtaining the DHCP configuration information currently present on the one or more hosts comprises:

determining that the DHCP configuration information currently present on at least one host that corresponds to a unique identifier stored in the non-volatile memory cannot be obtained from the network; and provisioning the at least one host with new DHCP configuration information, wherein the DHCP configuration information currently present on the one or more hosts includes the new DHCP configuration information provisioned to the at least one host.

9. A Dynamic Host Configuration Protocol (DHCP) server, comprising:

non-volatile memory configured to store unique identifiers that correspond to one or more hosts in a network that the DHCP server has provisioned with Internet Protocol (IP) configuration information, wherein the unique identifiers uniquely identify the one or more hosts in a routing domain associated with an Open Shortest Path First (OSPF) area, a routing IP address, a subnet mask, and a gateway, wherein the DHCP server provisions the IP configuration information to the one or more hosts in a standalone deployment; and one or more processors configured to:

obtain, from the network, DHCP configuration information currently present on the one or more hosts that correspond to the unique identifiers stored in the non-volatile memory in response to the DHCP server failing;

repopulate a DHCP database associated with the DHCP server based on the DHCP configuration information currently present on the one or more hosts;

send a configuration query message to each host that corresponds to a unique identifier stored in the non-volatile memory; and receive a response to the configuration query message from at least one host that corresponds to a unique identifier stored in the non-volatile memory, wherein the response to the configuration query message includes the DHCP configuration information currently present on the at least one host.

10. The DHCP server recited in claim 9, wherein the DHCP server provisions the IP configuration information to the one or more hosts in a standalone deployment and the one or more processors are further configured to:

receive, from a DHCP summary node, summarized DHCP configuration information that corresponds to one or more hosts in a subnetwork managed with the DHCP summary node, wherein the DHCP configuration information currently present on the one or more hosts includes the summarized DHCP configuration information received from the DHCP summary node.

11. The DHCP server recited in claim 9, wherein the DHCP server comprises a recovering DHCP server that provisions the IP configuration information to the one or more hosts in combination with a mate DHCP server in a redundant deployment, wherein the mate DHCP server is a failover resource that communicates for the DHCP server in response to a failure associated therewith, and the one or more processors are further configured to:

update a local span of configuration list that includes the unique identifiers corresponding to the hosts that the recovering DHCP server has provisioned based on a mate span of configuration list received from the mate DHCP server in response to identifying one or more differences between the local span of configuration list and the mate span of configuration list;

send a configuration query message to each host that corresponds to a unique identifier in the updated local span of configuration list; and receive a response to the configuration query message from at least one host that corresponds to a unique identifier in the updated local span of configuration list, wherein the response to the configuration query message includes the DHCP configuration information currently present on the at least one host.

12. The DHCP server recited in claim 11, wherein the one or more processors are further configured to:

update the mate span of configuration list on the mate DHCP server based on the one or more differences between the local span of configuration list and the mate span of configuration list in response to mate DHCP server failing.

13. The DHCP server recited in claim 9, wherein the DHCP server comprises a recovering DHCP server that provisions the IP configuration information to the one or more hosts in combination with a mate DHCP server in a redundant deployment, wherein the mate DHCP server is a failover resource that communicates for the DHCP server in response to a failure associated therewith, and the one or more processors are further configured to:

receive, from a DHCP summary node, summarized DHCP configuration information that corresponds to one or more hosts in a subnetwork managed with the DHCP summary node, wherein the DHCP configuration information currently present on the one or more hosts includes the summarized DHCP configuration information received from the DHCP summary node.

14. The DHCP server recited in claim 9, wherein the one or more processors are further configured to:

determine that the DHCP configuration information currently present on at least one host that corresponds to a unique identifier stored in the non-volatile memory cannot be obtained from the network; and provision the at least one host with new DHCP configuration information, wherein the DHCP configuration information currently present on the one or more hosts includes the new DHCP configuration information provisioned to the at least one host.

15. A non-transitory computer-readable storage medium having computer-executable instructions recorded thereon, wherein executing the computer-executable instructions on a Dynamic Host Configuration Protocol (DHCP) server causes the DHCP server to:

store, in non-volatile memory, unique identifiers that correspond to one or more hosts in a network that the DHCP server has provisioned with Internet Protocol (IP) configuration information, wherein the unique identifiers uniquely identify the one or more hosts in a routing domain associated with an Open Shortest Path First (OSPF) area, a routing IP address, a subnet mask, and a gateway, wherein the DHCP server provisions the IP configuration information to the one or more hosts in a standalone deployment;

obtain, from the network, DHCP configuration information currently present on the one or more hosts that correspond to the unique identifiers stored in the non-volatile memory in response to the DHCP server failing;

repopulate a DHCP database associated with the DHCP server based on the DHCP configuration information currently present on the one or more hosts;

send a configuration query message to each host that corresponds to a unique identifier stored in the non-volatile memory; and receive a response to the configuration query message from at least one host that corresponds to a unique identifier stored in the non-volatile memory, wherein the response to the configuration query message includes the DHCP configuration information currently present on the at least one host.

16. The non-transitory computer-readable storage medium recited in claim 15, wherein the DHCP server comprises a recovering DHCP server that provisions the IP configuration information to the one or more hosts in combination with a mate DHCP server in a redundant deployment, wherein the mate DHCP server is a failover resource that communicates for the DHCP server in response to a failure associated therewith.

* * * * *